United States Patent
Roberts et al.

[15] 3,645,313
[45] Feb. 29, 1972

[54] PNEUMATIC TIRES

[72] Inventors: Glyn B. Roberts, Four Oaks; Thomas Holmes, Walmley, both of England

[73] Assignee: Dunlop Holdings Limited, London, England

[22] Filed: Jan. 19, 1970

[21] Appl. No.: 3,822

[30] Foreign Application Priority Data

Jan. 23, 1969 Great Britain..........................3,840/69

[52] U.S. Cl. ..........................................152/209 R, 152/325
[51] Int. Cl. ....................................B60c 11/10, B60c 11/12
[58] Field of Search ..........................................152/209, 325

[56] References Cited

UNITED STATES PATENTS 3,409,064 11/1968 Leonard ................................152/209

FOREIGN PATENTS OR APPLICATIONS 546,975 8/1942 Great Britain..........................152/209

Primary Examiner—Arthur L. La Point
Assistant Examiner—D. W. Keen
Attorney—Stevens, Davis, Miller & Mosher

[57] ABSTRACT

A tire having a tread portion the ground-contacting surface of which is provided with water-absorbing chambers extending into the depth of the tread rubber and closed at their inner ends. The chambers are of circular cross section at the surface of the tread and of diameter from 2.5 mm. to 0.25 mm. or have equivalent cross-sectional area at said surface and are of other cross-sectional shape. A portion at least, of the wall of each of a substantial number of the chambers is provided with asperities serving to restrict the flow of water into the chambers. The chambers are spaced apart at a distance of from 20 mm. to 0.375 mm. measured at the surface between a given reference point on the chambers and the quantity of chambers provided is such as to reduce the tread wearing surface of the tire by no more than 35 percent.

17 Claims, 14 Drawing Figures

PNEUMATIC TIRES

This invention relates to both solid and pneumatic tires.

In the specification of the assignees U.S. Pat. No. 3,409,064 and in the specification of our U.S. application for a patent Ser. No. 788,626 of Dec. 20, 1968, now abandoned, there is described a tire provided on the ground-contacting surface with a plurality of water-absorbing chambers of circular cross section with diameters varying from 5 mm. to one-eighth mm. or of other cross-sectional shape and equivalent cross-sectional area. The size and spacing of the holes is described enabling satisfactory water absorption to be achieved and the use of fine closely spaced chambers is the subject of the specific improvement described in the said application for the patent of addition.

It is an object of the present invention to obtain tire wherein still further improvement is water absorption can be achieved for a given size of chamber in a given spaced arrangement thereof.

According to the present invention, a tire is provided comprising a tread portion, the ground-contacting surface of which is provided with water-absorbing chambers extending into the depth of the tread rubber and closed at the radially inner ends thereof, each chamber being of circular cross section at said surface and of diameter from 2.5 mm. to 0.25 mm. or having an equivalent cross-sectional area at said surface and being of other cross-sectional shape at least a portion of the wall of each of a substantial number of the chambers being provided with asperities serving substantially to restrict the rate of flow of water into the chambers and thus delay absorption thereby prior to entry into the viscous film region, said chambers being spaced apart whereby the distance between a given reference point on the chamber and an equivalent point of the closest neighboring chamber thereto is from 20 mm. to 0.375 mm. measured at said surface, the quantity of chambers provided in all cases being such as to reduce the tread wearing surface of the tire by no more than 35 percent compared with an otherwise identical tire not provided with said chambers.

The apserities on the walls of the chambers may be formed by the roughening created by a rotating drill used to form the chambers or may be formed by the nature or form of the surface of the pin or other molding matrix utilized in molding the tread rubber. In chambers of about 0.5 mm. to 2 mm. diameter, asperities averaging in height in the area in which they are provided about 0.03 mm. and greater up to 0.1 mm. or more have been found to give an improved water absorption by restriction of rate of water flow as aforesaid.

The cross-sectional shape of the chambers as is realized in the specification of the assignees U.S. Pat. No. 3,409,064, may be crescent-shaped lozenge-shaped, rectangular-shaped or of a nonsymmetrical shape, different shapes or combinations of shapes and figures, localized or over the whole of the ground-contacting surface of the tread, being included as required in a single tire.

Some or all of the chambers can narrow or widen from one part to another at different chamber depths, and the cross-sectional area of any given chamber may have a plurality of different values at different depths. Part only of the depth of some or all of the chambers may be provided with asperities, preferably the entry portion.

The disposition of some or all of the chambers with respect to the ground-contacting surface of the tread may be at right angles thereto and inclined at any angle thereto, and combinations of right-angle-disposed and inclined chambers may be incorporated in any one tire.

The depth of the chambers may be as great as or greater than the depth of the grooves of the general pattern applied to the tread and some or all of the chambers may extend to a depth of up to 5 mm. below the deepest groove provided in the tread, provided that the tread rubber is able to accommodate such a depth of chamber without the tire carcass being penetrated. It will be appreciated that with this range of dimensions a ratio of depth to maximum length or diameter of chambers measured at the ground-contacting surface may be as high as 100:1.

The superior wet grip properties of a tire provided with chambers in the tread portion thereof having walls provided with asperities according to the invention, over a tire provided with chambers in the tread portion thereof having comparatively smooth walls, may be understood from the following description.

If a tire is considered rolling over a water wet surface, with the tread thereof contacting said surface and the tread being provided with a plurality of water-absorbing chambers, the chambers while traversing the water wet ground surface will absorb water therefrom, this water being forced into the chambers against a back pressure of air contained therein. The absorbed water will be expelled by centrifugal force and air pressure during the period wherein each chamber is not in contact with the water wet surface.

The tire will be preceded by a wedge of water penetrating the ground contact patch. Trailing directly behind the water wedge is a water film region of very small thickness hereinafter referred to as the "viscous film region" which region is a transitional region between the wedge of water a nd a substantially dry region which trails directly behind said viscous film region. It is the size of the dry region that determines the grip between the rite and the ground.

If a chamber is considered devoid of water approaching the ground contact patch during a revolution of the tire rolling over the water wet surface, as the chamber traverses the water edge, water is urged into the chamber against the developed back pressure of the compressed air within the chamber. When the chamber enters the viscous film region it continues to absorb water, provided that its water capacity has not been fully satisfied during its traversal of the wedge of water, this water being urged into the chamber by the contact pressure of the surrounding tread; the amount of water absorbed in this region is dependent on the length of time to traverse this region.

It is considered that a relatively small diameter chamber when compared with relatively larger diameter chambers of the same depth will absorb relatively less water while traversing the water wedge due to surface tension effects becoming more pronounced at small diameters. Thus a relatively small diameter chamber will have a relatively higher water-absorbing capacity in the viscous film region. It should be noted that the fluid pressure in the viscous film region is much greater than that of the water wedge and consequently the potential water-absorbing capacity of chambers of any size both small and large in this region may be more fully realized unless as is the case with the relatively large chambers the potential water clearance capacity of the chambers is partly or fully satisfied during traversal of the water wedge. Whether the chambers are small or large in cross section it has been found that by provision of asperities the rate of flow of water into the chamber in the "water wedge" region is substantially reduced there being a comparatively greater remaining capacity available in the "viscous film" region for the absorption of water by the chambers to provide a very substantial dry patch region for tire road grip.

The water-clearing capacity of the chambers can undesirably be limited by the tendency of water accepted by a chamber to compress the air into the confined space at the closed end of the chamber, the pressure set up restricting the entry of further water completely to fill the chamber though it will be appreciated that the present invention is concerned with the controlled restriction of rate of flow by the provision of chamber-wall asperities. If, however, the chamber has a cross-sectional area which increases from the entry to the opposite closed end, then the degree of compression of the trapped air is reduced, for a given volume of accepted water, compared with a chamber of equal entry cross-sectional area and of uniform cross-sectional area throughout its length. In this respect, for example, bulbous-ended chambers or frustoconical chambers may be used.

However, it may be advantageous in some cases to provide the chambers with an entry portion of greater cross-sectional area than the body portion thereof. Such cases might arise of instance when it is desired to mold chambers in a tire tread. In such cases, definite advantage would arise if the molding pins for molding the chamber were each provided with a webbed or otherwise enlarged base to yield a more rigid and durable molding pin. It will be appreciated that the molding surface of the pin and of the webbed or enlarged base may be provided with a molding surface for producing asperities.

As regards the positional distribution of the chambers, they may be in lines parallel to circumferential directions and may also be in staggered echelon formation, preferably arranged so that there is no point across the width of the ground-contacting portion of the tire which would not be in substantial circumferential alignment, somewhere around the tread periphery, with a chamber. Alternatively, the distribution of the chambers is of a random or an irregular nature either linearly of the tread, the distribution being ordered in another direction, or wholly irregular or random. The chambers may be distributed over certain spaced-apart regions on the tread. In addition, the distribution of the chambers may be ordered in some regions and irregular or random in other regions.

As regards the density of concentration of the chambers, a practical limit may be set by the reduction of wearable tread surface caused by the provision of the chambers and the practical limit is the overall removal of 35 percent of the whole wearable surface.

For example, if the chambers are arranged in a square pattern, where the chambers are circular of diameter 2.5 mm. the minimum practical spacing between adjacent chambers will be approximately 3.75 mm. and where the chambers are circular of diameter 0.25 mm. the minimum practical spacing between adjacent chambers will be approximately 0.375 mm.

In many cases a reduction of tread wearable surface of the order of 2 percent, for example from 1 percent to 5 percent, is employed though greater reductions in wearable surface need not result in lower tread life over the life of a tread not provided with chambers. Furthermore, for example with aircraft tires landing on a wet surface, when the tire fails to rotate during part or whole of the landing run, can cause heat degradation of the tread. This may be at least partly avoided in tires with chambers since the tire will continue to rotate and thus effectively the tread life is increased by reduction of heat degradation.

By way of example, if the chamber is of cylindrical form and is applied to a motorcycle tire the following figures are applicable:

a. 2 mm. maximum diameter chamber 6,950 chambers per square meter measured at the tread surface giving a 12 mm. spacing between centers, a minimum asperity height of 0.02 mm. being provided with asperities completely covering the chamber walls.

b. 1 mm. maximum diameter chamber 27,800 chambers per square meter measured at the tread surface giving a 6 mm. spacing between centers a minimum asperity height of 0.01 mm. being provided with asperities completely covering the chamber walls.

c. one-half mm. maximum diameter chamber 111,200 chambers per square meter measured at the tread surface giving a 3 mm. spacing between centers, a minimum asperity height of 0.005 mm. being provided with asperities completely covering the chamber walls.

d. one-fourth mm. maximum diameter chamber 444,800 chambers per square meter measured at the tread surface giving a 1.5 mm. spacing between centers, a minimum asperity height of 0.0025 mm. being provided with apserities completely covering the chamber walls.

In each of the examples (a), (b), (c) and (d) the product of the square of the diameter and the number of the chambers per unit area is a constant and equal to approximately 27,800 mm.$^2$ per square meter.

In order to dispose of the bulk water lying on a road surface over which a tire is to run, before dealing with the disposal of the remaining water by means of the chambers, it may be desirable to have generally circumferential grooves between ribs and/or slots for channeling away the bulk water.

It may be an advantage, in some tires, particularly motor car tires, to have a combination of chambers, of the kind provided according to the present invention, and slots of the kind provided in accordance with the invention described in the assignees U.S. Pat. No. 3,332,465, the location of the chambers being preferably in a region of high contact pressure, e.g., in a tire where the high contact pressure occurs in the crown region, the chambers will be located there while the slots are provided on each side of the crown region either alone or combined with chambers.

It will be understood that the whole of the ground-contacting surface of the tread need not be provided with chambers but only certain selected areas of that surface.

The tire in accordance with the invention may be provided on at least one shoulder portion with a plurality of generally radial and axially outwardly extending faces projecting into the region adjacent to the tire shoulder said faces being disposed so that they will be engaged by water associated with a surface over which the tire is to run to tend to decrease the relative velocity of the tread portion and the surfaces during movement of the tire upon the wet surface. The faces may be formed one upon each of plurality of rubber elements attached to or molded on the tire. The elements may be solid blocks or pockets. Tires having such faces on their shoulder portions are described in the specification of assignees U.S. Pat. No. 3,568,747.

Alternatively the tire in accordance with the invention may be provided on the ground-contacting tread portion with a plurality of water-receiving recesses each having at least one face to be engaged by water standing on a surface over which the tire is to run and water outlet means associated with at least some of the recesses to promote the flow of water through the recesses and against said faces to effect a hydrodynamic action which tends to reduce the relative speed of the ground-contacting portion with respect to the water-covered surface during slipping of the tire upon said surface. Tires having such recesses are described in the specification of copending assignees U.S. Pat. No 3,532,157.

In addition chambers with asperities according to the present invention are easily formed in a fabric reinforced tread tire, the provision of chambers in reinforced tread tires being described in copending assignees U.S. Pat. No. 3,543,827.

One embodiment of the invention will now be described in more detail by way of example.

A motorcycle tire of size 4.00—18 has a tread portion incorporating five generally circumferentially extending grooves to drain the bulk of water from the contact patch of the tire on a wet road. The grooves define four ribs and shoulder blocks in the tire tread, the ribs being provided with a plurality of chambers which are cylindrical. The said chambers have a diameter of approximately 1 mm. and a depth of approximately 6 mm., the chambers extending below the depth of the grooves by 2 mm. The center-to-center spacing between the chambers is approximately 6 mm. the number of chambers per square being 27,800. The arrangement described results in approximately 2 percent removal of the total possible rubber available for wear. Each of the chambers is provided over the whole of its walls with asperities having a minimum size of 0.01 mm., the chambers being formed by drilling into the vulcanized rubber of the tread.

In operation of this tire on a wet surface a substantially increased grip is obtained, compared with the grip obtained with an exactly similar patterned tire with chambers having substantially smooth walls.

The invention has been specifically described above in respect of a motorcycle tire but it is applicable to other tires of tires, for example, brakable aircraft tires, motor car tires, truck tires and solid tires.

Tests have been carried out an aircraft tires and motor car tires to examine the effect of providing water-absorbing chambers with asperities.

The tests will now be described by way of the example, making reference to FIGS. 1 to 9 of the accompanying drawings in which.

Figure 1:
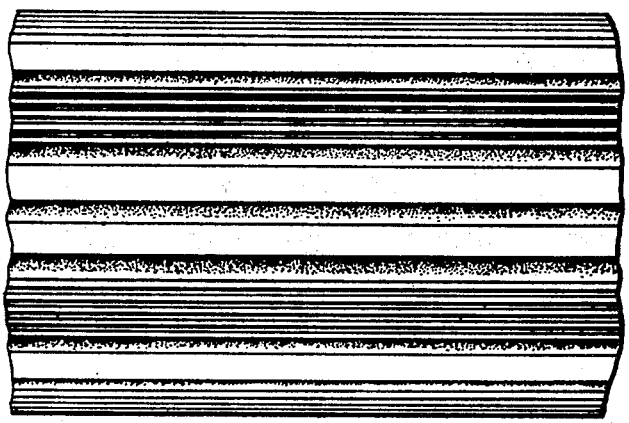
FIG. 1 shows an aircraft tire having a grooved treat but no water-absorbing chambers.
Figure 2:
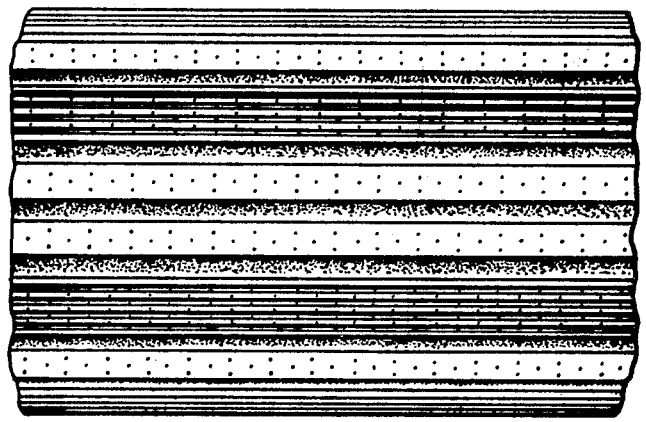
FIG. 2 shows an aircraft tire having a similar tread except that is it provided with water-absorbing chambers.

Comparative tests were carried out with two different sets of main-wheel tires fitted to the main wheels of a Hunter aircraft, the first tests being carried out with one set of tires having no water-abosrbing chambers as shown in FIG. 1 and the second tests being carried out with a second set of tires having the same tread pattern but provided with water-absorbing chambers as shown in FIG. 2. These chambers extend radially inwardly from the tread surface to a depth of 7 mm. (i.e., the same depth as the depth of the circumferential drainage grooves.)

Figure 3:
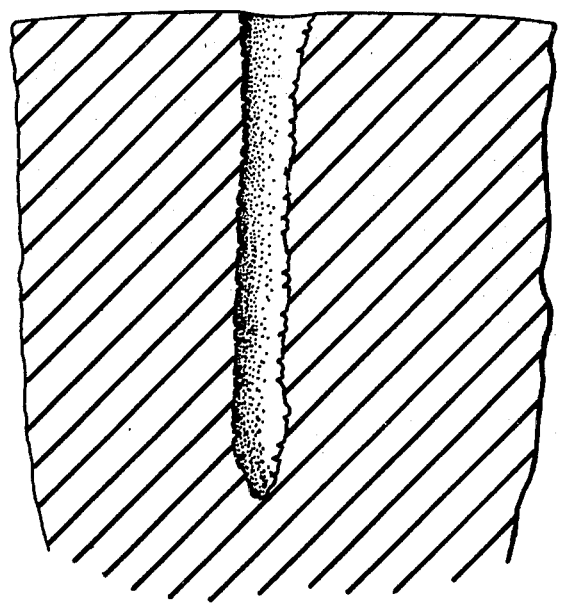
FIG. 3 is a section through a single water-absorbing chamber showing the asperities on the walls.

The holes were spaced at one-fourth inch (6.3 mm.) centers and disposed in echelon formation as shown in FIG. 2. The holes were drilled with a fluted twist drill of size 57 gauge (0.043-inch diameter), the speed of rotation of the drill being approximately 5,000 r.p.m. The final size of the holes, on account of the resilience of the rubber is the order of 0.02 inches (0.508 mm.), asperities being formed on the internal walls of the holes with projected length of the order of 0.002 inch (0.0508 mm.) extending generally radially from the wall of the hole this being illustrated in FIG. 3 of the accompanying drawings. The drilled holes account for the removal of one-half to 1 percent tread rubber surface area.

It has been found that in drilling the holes, too high a speed of feeding or withdrawal will not enable a hole of sufficient depth and required diameter to be obtained on account of rubber resilience and compression and on the other hand too slow a seed of feeding and withdrawal, or dwell within the hole, causes the rubber to be locally degraded whereby the holes are at least partially blocked with the degraded plastic rubber. The appropriate speeds, however, can readily be ascertained by experiment.

The tread rubber composition used for these aircraft tires is a typical natural rubber tread composition. It has been found that asperities of a desired size can be produced in tread compositions of different formulations by appropriately selected speeds of rotation, diameter of drill to produce the required eventual hole size and degree and form of fluting on the drill.

The main wheel tires in all tests were inflated to an inflation pressure of 200 pounds per square inch.

The tires were tested on a runway surface comprising a top dressing of asphalt on a concrete base, the asphalt dressing having a generally smooth appearance and the runway being wetted to maintain it in a completely wet state, frequent puddles being formed of water depth of up to 0.1 inches, the wet surface extending over a distance of about 2,000 feet.

During the tests the aircraft was run into the 2,000-foot length of wetted runway surface and braked, the series of runs being made at speeds of from 139 to zero knots, the higher speeds being obtained from a touched-down aircraft whereas the lower speeds were obtained entirely by ground runs.

Figure 6:
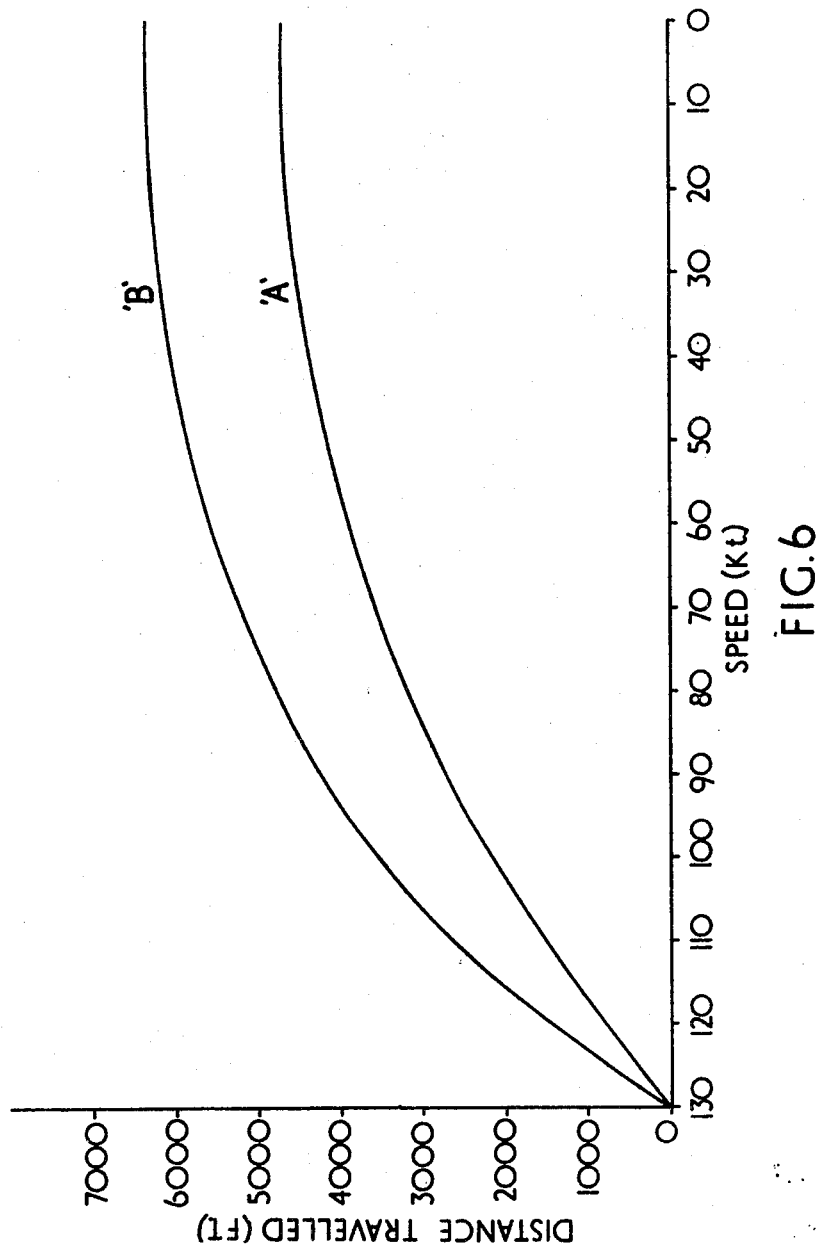
FIG. 6 is a graph in which total stopping distance is plotted against initial aircraft speed for a Hunter aircraft using tires as shown in FIG. 1 and tires as shown in FIG. 2.
Figure 7:
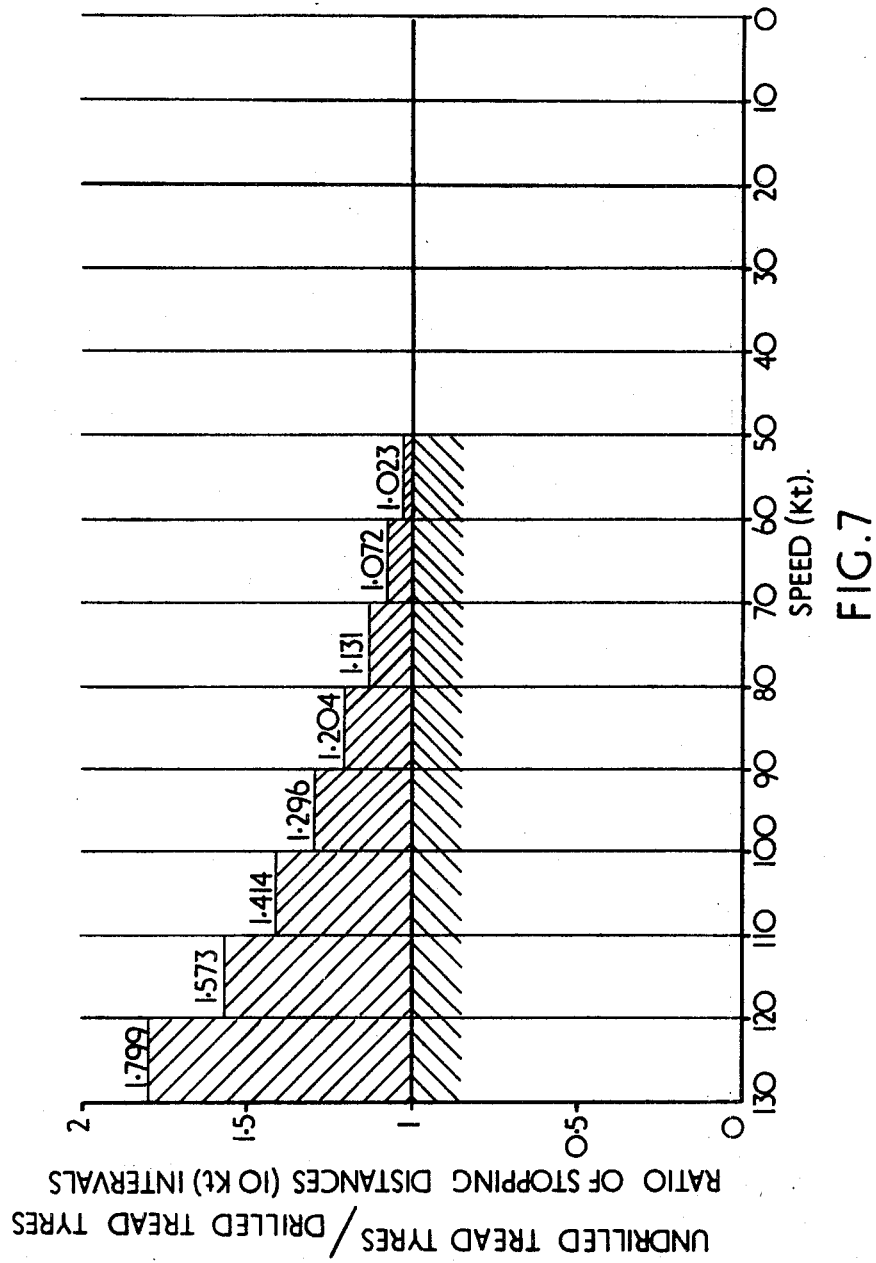
FIG. 7 is a histogram showing the ratio of stopping distance of the Hunter aircraft on the undrilled tires to the stopping distance on drilled tires, the ratios being taken at starting speeds from 130 kt. to 50 kt. at intervals of 10 kt.

The high speed advantage, on wet surfaces, of the tires with the drilled holes is demonstrated by the test results and is illustrated in the accompanying graphs in FIGS. 6 and 7 of the accompanying drawings.

From the graphs the wet stopping distances (calculated from deceleration measurements and since confirmed from from actual aircraft instrument traces) from speeds ranging from 130 knots downwards is substantially reduced for the drilled tires (curve A on FIG. 6) compared with the undrilled tires (curve B on FIG. 6). For example (FIG. 6) in braking from 130 knots to a halt the distances were 6,353 feet (undrilled tread tires) and 4,696 feet (drilled tread tires), the corresponding distances for braking from 130 to 50 knots being 5,815 feet (undrilled tread tires) to 4,148 feet (drilled tread tires).

FIG. 6 compares speed of travel in knots with the wet distance travelled in feet, curve A relating to the drilled tread tires and curve B to the undrilled tread tires; FIG. 7 illustrates over an overall speed range of 130 to 50 knots at 10-knot intervals, the ratio of wet stopping distance of the undrilled tread tires to the drilled tread tires, a ratio in favor of the drilled tread tires being obtained over this whole speed range.

The advantage of the invention is particularly marked in respect of vehicles fitted with skid-controlled wheels, i.e., provided with a mechanism which momentarily releases the wheel brakes, just prior to the development of skid conditions, reapplying them to restore braking action, the cycle continuing to obtain as near as possible optimum skid-free wet braking conditions. The invention, however, does not show the advantage in the skidding or locked wheel condition. It will be appreciated, however, that the invention is of value not only in straight-ahead braking conditions, but is additionally of value in the development, under wet conditions, of increased lateral cornering force compared with that developed by the same tires without chambers provided with internal asperities.

The aircraft tires just referred to utilized drilling as a means for producing asperities in holes, elsewhere referred to as chamber. It will be appreciated that the asperities may be produced by other means for example molding with pins having a surface roughened by etching or machining.

Whereas in the preceding paragraphs a rubber tread compound is referred to of typical formulation, in an alternative example the compound will include natural or synthetic filaments for example, textile such as rayon or nylon or steel or glass, so that when the holes are formed in the molded tread the filaments form or contribute to the formation of the asperities.

In the instance of some tires, for example motor car tires, the use of holes in the tread with asperities can be combined with the provision of antiskid tread studs.

Further tests have been carried out on tires subjected to lower inflation pressure, and loads compared with the aircraft tires the subject of the previous tests. These tires were of car tire size (185—15) and are illustrate in FIG. 4—undrilled— and in FIG. 5—drilled.

The tires, separately, were tested on a rotating drum under a load of 1,120 lbs. inflated to a pressure of 28 lbs. per square inch.

Figure 4:
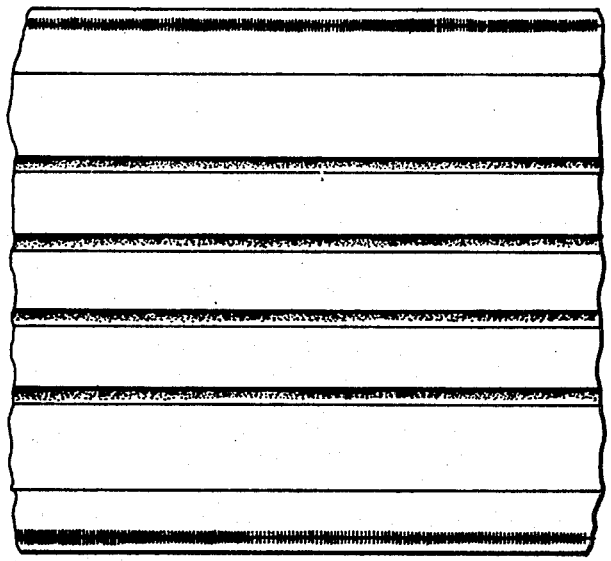
FIG. 4 show a motor car tire having a grooved tread but no water-absorbing chambers.
Figure 8:
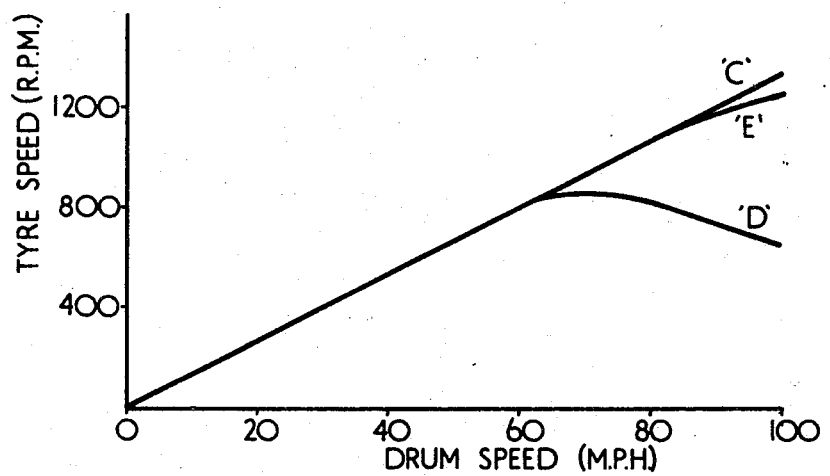
FIG. 8 is a graph on which tires speed is plotted against drum speed for the tires shown in FIGS. 4 and 5 rotating against a drum in dry, and in wet conditions.

The undrilled tire shown in FIG. 4 was first tested upon a dry drum surface; the tire speed was shown to increase linearly with drum speed as shown in curve C in FIG. 8 indicating that there was no measurable slip between tire and drum.

The undrilled tire was next tested under wet drum conditions, water being fed at a constant feed rate of 10 gallons per minute onto the drum face in the region of the front of the tire/drum contact face. It will be seen from curve D. on FIG. 8 that the tire speed increases linearly with the drum speed, exactly as with the dry drum, up to a speed which we may term the "critical speed" for the conditions. Above this speed the tire slows down to run at a speed considerably lower than that achieved under dry drum conditions, i.e., the grip between the tire and drum under these conditions is insufficient to maintain the dry drum speed.

Figure 5:
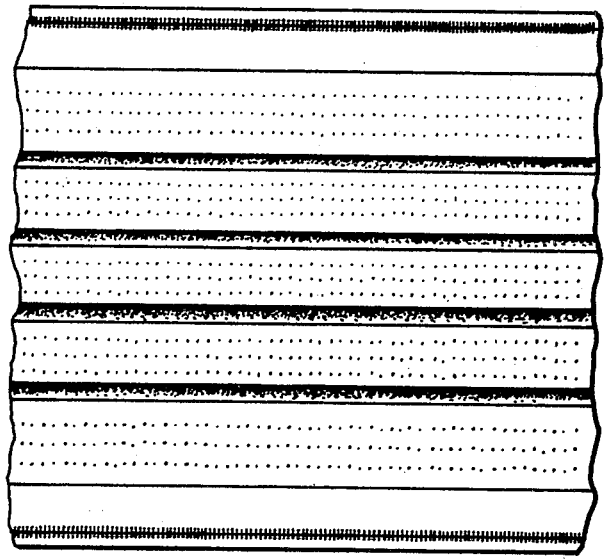
FIG. 5 shows a motor car tire having a similar tread except that it is provided with water-absorbing chambers.

The drilled tire shown in FIG. 5 was run under the same wet test conditions as the undrilled tire and it will be seen from FIG. 8 that the curve E for the drilled tire departs from curve C for the dry drum tested tire at a higher tire speed than that shown by the curve D for the drilled tire in that it continues to increase in speed throughout the test up to the maximum drum speed, conforming more closely to the dry drum curve. Thus as the higher speeds the grip between drilled tire and drum necessary to maintain tire speed is developed at a lower slip condition than is developed in the case of the undrilled tire.

The same tires were then tested under drum conditions, other conditions of load, inflation pressure and drum wetness being maintained as before. The drum speed was maintained constant while the braking force developed in the tire drum contact area were progressively increased, the tire speed decreasing progressively with the increasing braking forces. (curve Simultaneous measurements were made of drum speed, tire speed and braking forces.

Figure 9:
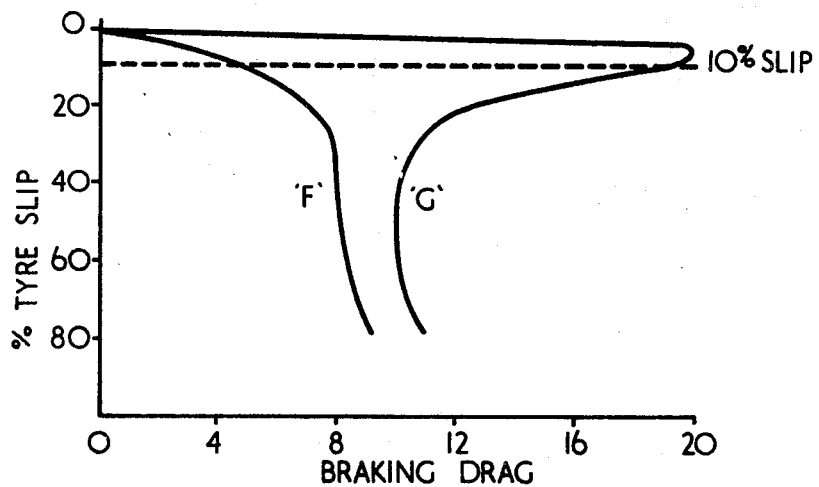
FIG. 9 is a graph on which a tire slip is plotted against braking drag for the tires shown in FIGS. 4 and 5.

The set of curves obtained at constant drum speed of 60 m.p.h. are illustrated in FIG. 9. It will be seen that in the case of the undrilled tires (curve F) there was a progressive increase in tire braking force with decreasing tire speed, that is with increasing slip. A braking rate of about 8 units was supported at a slip of the order of 30 percent. Whereas in the case of a drilled tire (curve G) the braking face increases rapidly to a high peak value of about 20 units at approximately an 8 percent slip condition, thereafter falling to a lower value—approximately 10 units at 30–40 percent slip.

The curves F and G illustrate graphically that the drilled tire is able to generate significantly higher grip to support higher braking forces, the grip being developed at significantly lower slip values, than the undrilled tire.

The behavior is similar but the effect is of different magnitude at other drum speeds than the 60 m.p.h. value illustrated.

Figure 10:
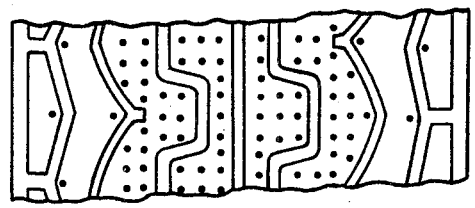
FIG. 10 shows the tread pattern and the pattern of the chambers in the motorcycle tires used.

Further comparative tests were carried out to investigate the difference in performance between a motorcycle tire with smooth-walled chambers in the tread and a motorcycle tire with chambers having asperities on their walls, and are described below by way of example with reference to FIGS. 10, 11 and 12 of the accompanying drawings in which:

FIG. 10 shows the tread pattern and the pattern of the chambers in the motorcycle tires used.

Figure 11:
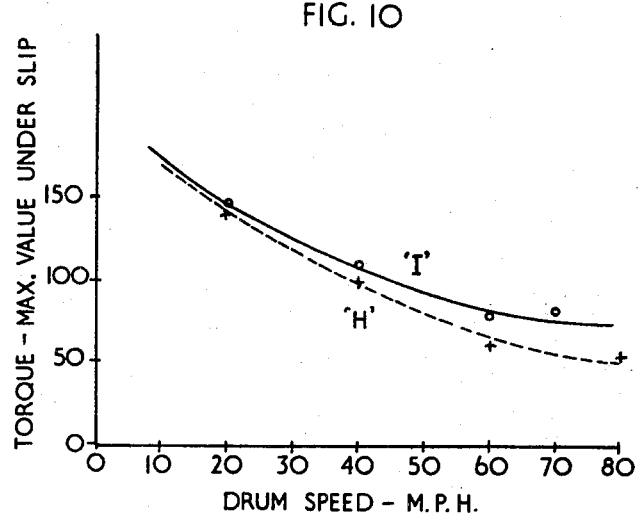
FIG. 11 is a graph on which maximum braking torque developed when the tire is rotating against a wet drum is plotted against drum speed for the two tires and FIG. 12 is a graph similar to that in FIG. 11 except that the wet drum had a higher feed rate of water to its surface.
Figure 12:
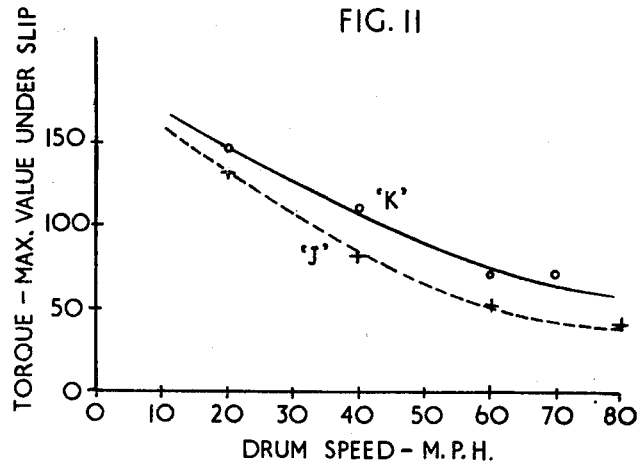
Figure 13:
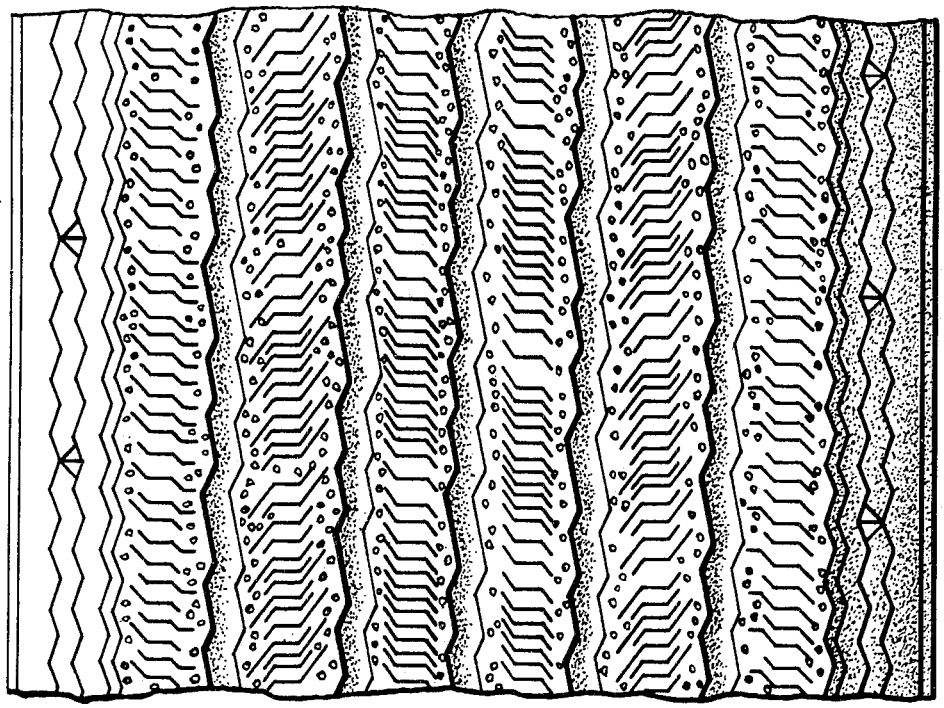
FIG. 13 is a plan view of a segment of a tire having transverse slots and the water-absorbing chambers of this invention.
Figure 14:
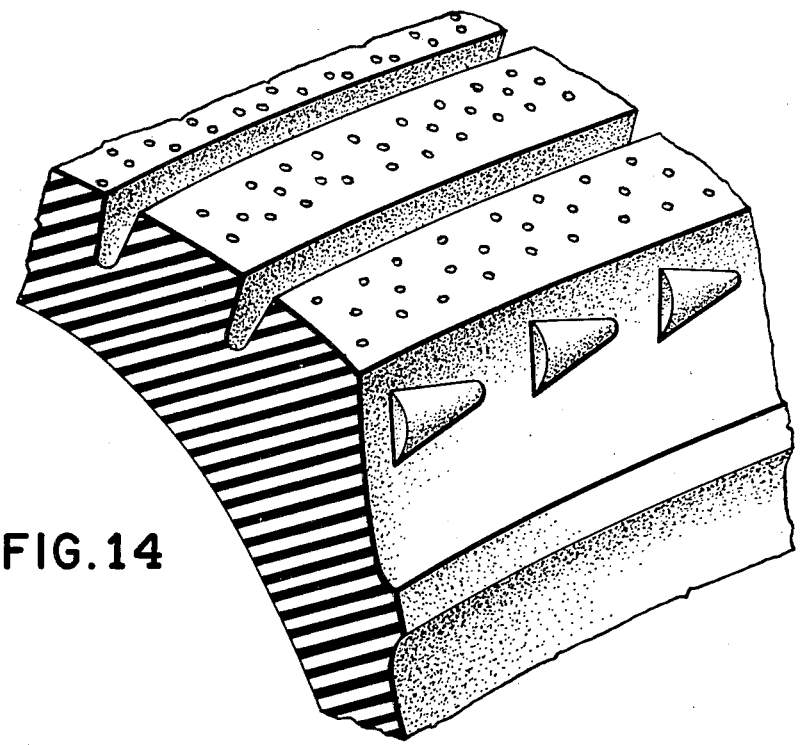
FIG. 14 is a perspective view of a segment of a tire having axially outwardly extending faces along he shoulder and the water-absorbing chambers of this invention.

FIG. 11 is a graph on which maximum braking torque developed when the tire is rotating against a wet drum is plotted against drum speed for the two tires and FIG. 12 is a graph similar to that in FIG. 11 except that the wet drum had a higher feed rate of water to its surface.

The tires used were racing motorcycle tires size 3.25—18 each having the tread pattern illustrated in FIG. 10 of the accompanying drawings. The water-absorbing chambers were arranged in a square pattern in the tread at a spacing of one-fourth inch.

The smooth-walled chambers in the first tire (hereinafter designated tire X) were formed by smooth surfaced molding pins during molding of the tire and had a diameter of 1 mm. at the tread surface.

The rough-walled chambers in the other tire (hereinafter designated tire Y) were formed by hand drilling, the drill size, drill speed and drill feed rate being chosen to produce rough-walled chambers of average diameter the same as the average diameter of the smooth-walled molded chambers.

The depth of the chambers was the same in each case and was 5 mm.

The tires were separately tested on a rotating drum under a load of 1,080 lb.—equivalent to flat road load of 1,200 lb.—and an inflation pressure of 150 lb. per square inch.

Water was fed at a constant feed rate of 10 gallons per minute onto the drum face in the region of the tire/drum central face. At set drum speeds of 20, 40, 60 and 80 m.p.h. for tire X and 20, 40, 60 and 70 m.p.h. for tire Y the drum speed was maintained constant and a braking drag was applied to the tire so that a slip condition was induced between the tire and the drum. Measurement was made of drum speed, tire speed and braking torque developed by the tire. The maximum braking torque developed by the tire under these conditions was thus measured.

The results for tires X and Y are shown in curves H and I respectively in FIG. 11 where maximum torque developed is plotted against drum speed. From FIG. 11 it is apparent that the maximum braking torque developed by tire X at a particular drum speed was not as that developed by tire Y.

The whole test procedure was repeated for tires X and Y except that the water was fed onto the drum at a higher constant feed rate of 35 gallons per minute. The results obtained for tires X and Y are shown in curves J ad K respectively in FIG. 12 where, again, maximum braking torque developed was plotted against drum speed. Here again, at a particular drum speed, tire Y developed a higher maximum braking torque than tire X.

Thus the tire Y having the drilled chambers was able to sustain a higher braking torque, and therefore generate more grip, on the drum under wet conditions than tire X, having the molded chambers.

Having now described our invention what we claim is:

1. A tire comprising a tread portion, the ground-contacting surface of which is provided with water-absorbing chambers extending into the depth of the tread rubber and closed at the radially inner ends thereof, each chamber being of circular cross section at said surface and of diameter from 2.5 mm. to 0.25 mm. or having an equivalent cross-sectional area at said surface and being other cross-sectional shape, at least a portion of the wall of each of a substantial number of the chambers being provided with asperities serving substantially to restrict the rate of flow of water into the chambers and thus delay absorption thereby prior to entry into the viscous film region, said chambers being spaced apart whereby the distance between a given reference point on the chamber and an equivalent point on the closest neighboring chamber thereto is from 20 mm. to 0.375 mm. measured at said surface, the quantity of chambers provided in all cases being such as to reduce the tread wearing surface of the tire by no more than 35 percent compared with an otherwise identical tire not provided with said chambers.

2. A tire according to claim 1 in which the asperities on the walls of the chambers are formed by the roughening created by a rotating drill used to make the chambers.

3. A tire according to claim 1 in which the asperities are formed by the configuration of the surface of a molding pin used to mold the chamber.

4. A tire according to claim 1 in which the chambers have a diameter in the range 0.5 mm. to 2 mm. and the average height of the asperities in the area in which they are provided is in the range 0.03 mm. to 0.1 mm.

5. A tire according to claim 1 in which at least some of the chambers narrow or widen from one part to another at different chamber depths.

6. A tire according to claim 1 in which part only of the depth of at least some of the chambers is provided with asperities.

7. A tire according to claim 6 in which the said part is the entry portion.

8. A tire according to claim 1 in which the tread portion is provided with at least one circumferential water-drainage groove.

9. A tire according to claim 8 in which the depth of the water-absorbing chambers is at least as great as the depth of said at least one circumferential water-drainage groove.

10. A tire according to claim 1 in which the ratio of the depth of the water-absorbing chambers to their diameter or length measured at the ground-contacting surface of the tread is up to 100 to 1.

11. A tie according to claim 1 in which the water-absorbing chambers are arranged in staggered echelon formation.

12. A tire according to claim 1 wherein there is not point across the width of the ground-contacting portion of the tire which is not in substantial circumferential alignment somewhere around the tread periphery with a chamber.

13. A tire according to claim 1 in which the water-absorbing chambers are arranged in lines parallel to circumferential directions around the tire.

14. A tire according to claim 1 in which the reduction in wearable tread surface due to the presence of the chambers is from 1 percent to 3 percent.

15. A tire according to claim 1 in which the tread portion is provided with transverse slots for channelling away bulk water.

16. A tire according to claim 1 which is provided on at least one shoulder portion with a plurality of generally radial and axially outwardly extending faces projecting into the region adjacent to the tire shoulder, said faces being disposed so that they will be engaged by water associated with a surface over which the tire is to run to tend to decrease the relative velocity of the tread portion and the surface during movement of the tire upon the wet surface.

17. A tire according to claim 1 which is provided on the ground-contacting tread portion with a plurality of water receiving recesses each having at least one face to be engaged by water standing on a surface over which the tire is to run and water outlet means associated with at least some of the recesses to promote the flow of water through the recess and against said faces to effect a hydrodynamic action which tends to reduce the relative speed of the ground-contacting portion with respect to the water-covered surface during slipping of the tire upon said surface.

* * * * *

PO-1050
(5/69)

UNITED STATES PATENT OFFICE
CERTIFICATE OF CORRECTION

Patent No. 3,645,313      Dated February 29, 1972

Inventor(s) Glyn B. ROBERTS ET AL

It is certified that error appears in the above-identified patent and that said Letters Patent are hereby corrected as shown below:

Column 1, line 6, "Ser. No. 788,626 of Dec. 20, 1968, now abandoned" should read --Ser. No. 785,626 of Dec. 20, 1968, now U.S. Patent 3,637,001--;

Column 2, line 23, "rite" should be --tire--;

Column 4, line 56, after "square" --meter-- should be inserted;

Column 5, line 1, "treat" should read --tread--;

Column 5, line 63, "seed" should read --speed--.

Signed and sealed this 5th day of September 1972.

(SEAL)
Attest:

EDWARD M. FLETCHER, JR.
Attesting Officer

ROBERT GOTTSCHALK
Commissioner of Patents